United States Patent [19]
Savage et al.

[11] Patent Number: 5,966,128
[45] Date of Patent: Oct. 12, 1999

[54] IMPLEMENTATION OF FLAT NETWORKS IN HIERARCHICAL NETWORK MANAGEMENT SYSTEMS

[75] Inventors: Krista Savage, Dallas; Richard Bach, Garland; Thomas J. Anger, Plano, all of Tex.

[73] Assignee: Northern Telecom Limited, Montreal, Canada

[21] Appl. No.: 08/961,866

[22] Filed: Oct. 31, 1997

[51] Int. Cl.$^6$ .................................................. G06F 3/14
[52] U.S. Cl. ............................................ 345/356; 345/428
[58] Field of Search .................................. 345/969, 346, 345/428, 440, 356

[56] References Cited

U.S. PATENT DOCUMENTS

| | | | |
|---|---|---|---|
| 5,276,789 | 1/1994 | Besaw et al. | 345/969 |
| 5,471,399 | 11/1995 | Tanaka et al. | 364/491 |
| 5,483,631 | 1/1996 | Nagai et al. | 395/200.02 |
| 5,586,255 | 12/1996 | Tanaka et al. | 395/200.01 |
| 5,623,590 | 4/1997 | Becker et al. | 345/969 |
| 5,751,962 | 5/1998 | Fanshier et al. | 345/969 |

*Primary Examiner*—Mark K. Zimmerman
*Assistant Examiner*—David E. Brown
*Attorney, Agent, or Firm*—Haynes and Boone, L.L.P.

[57] ABSTRACT

A system and method are disclosed for generating a submap for nodes located within a flat network without reproducing the entire flat network in the submap. One method for implementing a flat network in a hierarchical network management system includes the steps of selecting a node of the flat network to create a submap having a node symbol, wherein the node symbol corresponds to the node, and generating a temporary symbol, in accordance with a predetermined criterion, for a link originating from the node symbol and terminating at the temporary symbol to represent a connection between the node and a second node of the flat network, wherein the temporary symbol maintains a characteristic of the second node. One system for establishing a submap for a flat network includes a processing unit coupled to a network processor and a storage unit coupled to the processing unit for storing data. The processing unit includes a graphics user interface for accepting commands from and displaying information to the operator and an application unit coupled to the graphics user interface and the network processor for displaying the flat network using the submap.

45 Claims, 6 Drawing Sheets

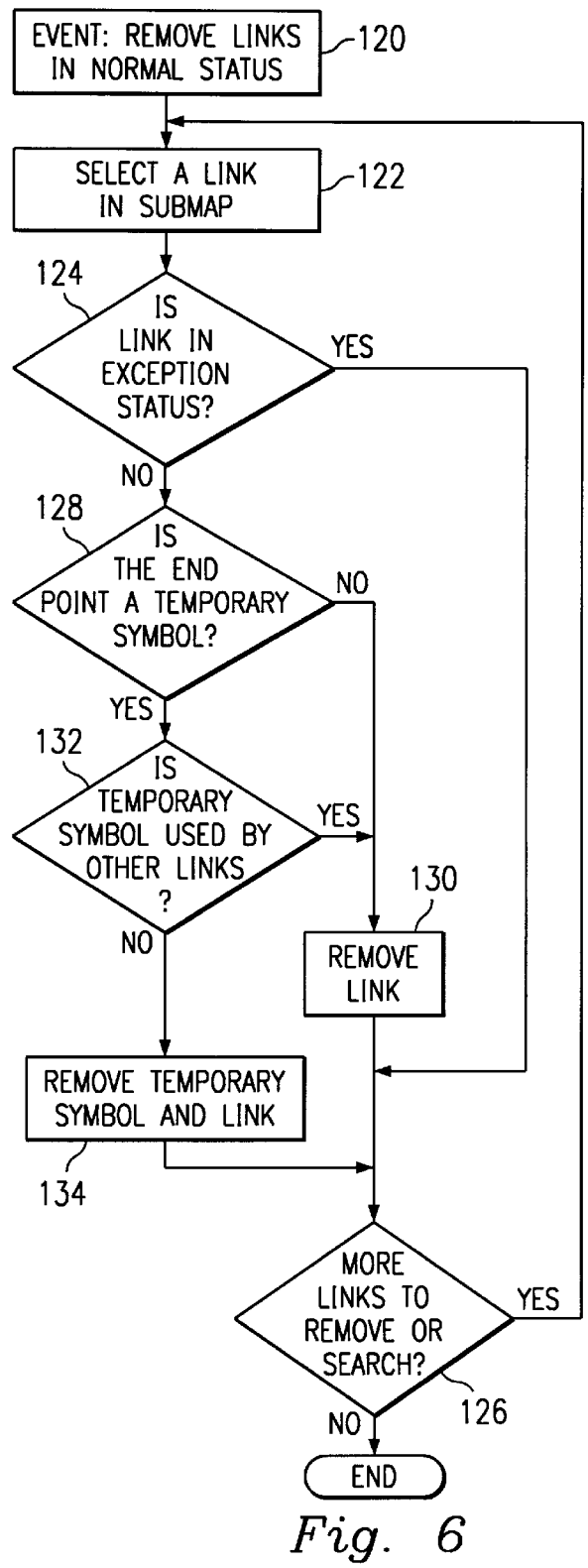
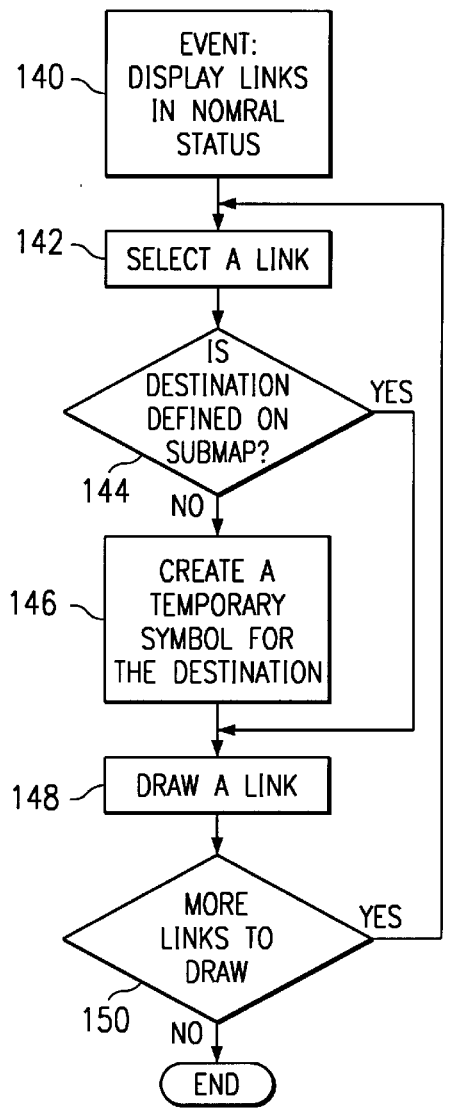
Fig. 6
Fig. 7

IMPLEMENTATION OF FLAT NETWORKS IN HIERARCHICAL NETWORK MANAGEMENT SYSTEMS

TECHNICAL FIELD

The invention relates generally to mapping techniques for use in communication networks and, more particularly, to a system and method for mapping a flat network by adapting the techniques for mapping a hierarchical network to flat networks.

BACKGROUND OF THE INVENTION

Communication networks, such as a data network or a telecommunications network, often become extremely complex in size and number of components. Considering for example a telecommunications network that covers the entire United States, such a network would contain many nodes (e.g., switches) interconnected by numerous links (e.g., trunks or lines). To analyze, monitor, or otherwise work with such a network, the network can be mapped in different ways, depending on the type of network.

One type of network is a hierarchical network. Hierarchical networks have a parent-child relationship between nodes. A parent node in a hierarchical network connects to several other sublevel nodes, each called a child. Therefore, the hierarchical network can be mapped at a desired level, showing only the parent nodes that exist at that level. Furthermore, a submap can be created by selecting one or more parent nodes and all sublevel nodes connected to the parent nodes.

Another type of network is a flat network. The above-described mapping techniques can not accommodate flat networks because flat networks do not have the parent-child relation. In a flat network, all nodes are interconnected to one another without a parent-child relation and some nodes may have links directly to every other node in the flat network. Therefore, selecting one node from the flat network to create a submap is not practical because of the interconnection between the selected node and other nodes, which can result in reproducing the entire network in the submap. Reproduction of the entire network in the submap is impractical because a single node can not be isolated and monitored. Furthermore, system resources would not be used efficiently and in the case of large networks, the system resources would be exhausted.

Therefore, what is needed is a system and method to generate a submap for nodes in flat networks without reproducing the entire flat network in the submap.

SUMMARY OF THE INVENTION

The foregoing problems are solved and a technical advance is achieved by a system and method that generates a submap for nodes located within a flat network without reproducing the entire flat network in the submap. To this end, one method for implementing a flat network in a hierarchical network management system includes the steps of selecting a node of the flat network to create a submap having a node symbol, wherein the node symbol corresponds to the node, and generating a temporary symbol, in accordance with a predetermined criterion, for a link originating from the node symbol and terminating at the temporary symbol to represent a connection between the node and a second node of the flat network, wherein the temporary symbol maintains a characteristic of the second node. One system for establishing a submap for a flat network includes a processing unit coupled to a network processor and a storage unit coupled to the processing unit for storing data. The processing unit includes a graphics user interface for accepting commands from and displaying information to the operator and an application unit coupled to the graphics user interface and the network processor for displaying the flat network using the submap.

A principal advantage of the present invention is that it can be used to map out any node in a network without reproducing the entire map for the network.

BRIEF DESCRIPTION OF THE DRAWINGS

FIG. 6 is a flowchart for an event process wherein a submap is defined to not display a normal status for links.

FIG. 7 is a flowchart for an event process wherein a submap is defined to show links with a normal status for a selected node symbol.

DESCRIPTION OF THE PREFERRED EMBODIMENT

Figure 1:
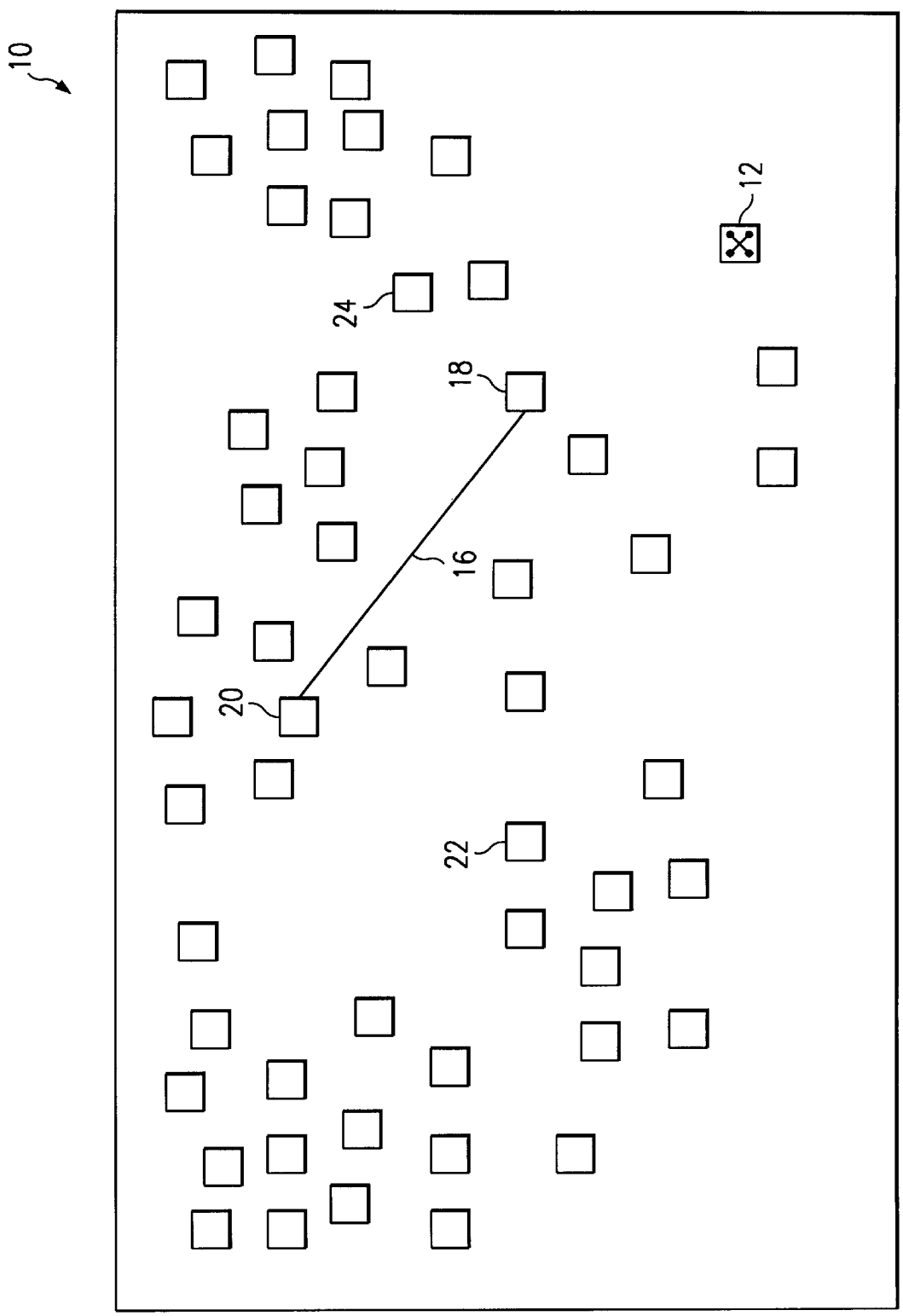
FIG. 1 is a root submap showing various node symbols corresponding to nodes or cities in a flat network wherein an operator has determined that links in normal status should not be displayed.

Referring to FIG. 1, a flat network is shown in a root submap, generally designated 10, having a submap symbol 12 to represent a submap, a link 16, and node symbols, such as node symbols 18, 20, 22, and 24. Even though several node symbols are shown, only a few are numerically labeled for illustration purposes. Furthermore, the number of node symbols in the root submap 10 will vary depending on parameters established by an operator. Generally, node symbols represent an area served by the network, such as switches in cities served by a telecommunication network covering the United States. Links represent the connection between two nodes in the network, such as a trunk line between two cities. Direct links connect two node symbols without the use of intermediate links and/or node symbols. For example, the link 16 is a direct link that originates from the node symbol 20 and terminates at the node symbol 18. Furthermore, direct links can be in either a normal status or an exception status. Links operating under normal conditions without any problems have the normal status. On the other hand, links having an exception status satisfy certain criteria, such as an overload condition, a configuration error, or other problem conditions. Links in exception status are always displayed, as discussed in detail below. For illustration purposes, only the links in exception status, such the link 16, are displayed in the root submap 10 while all other links that are in normal status are not displayed. However, the operator can select to display the links in normal status, as set forth below.

One characteristic of the flat network is that each node is linked to a select number of other nodes depending on the network design without a parent-child relation. Accordingly, the node symbols representing the nodes of the network are also linked to other node symbols to represent the interconnection of the network. For example, the node symbol 20 may be linked to node symbols 22 and 24 using links, which may be in either normal or exception status. Therefore, it is possible for each node symbol to be connected, with a direct link, to every other node symbol because in the flat network the nodes are interconnected without a defined parent-child relation. In order to simplify the representation of all links originating from a desired node symbol, the operator isolates the desired node symbol by moving or replicating the desired node symbol into a defined submap, such as the submap represented by the submap symbol 12. The operator determines whether the defined submap displays links, originating from node symbols, that are in the normal status. The operator creates the defined submap by selecting any number of node symbols, such as the node symbols 20, 22, and 24 from the root submap 10 and places the node symbols 20, 22, and 24 in the defined submap as discussed below.

Figure 2:
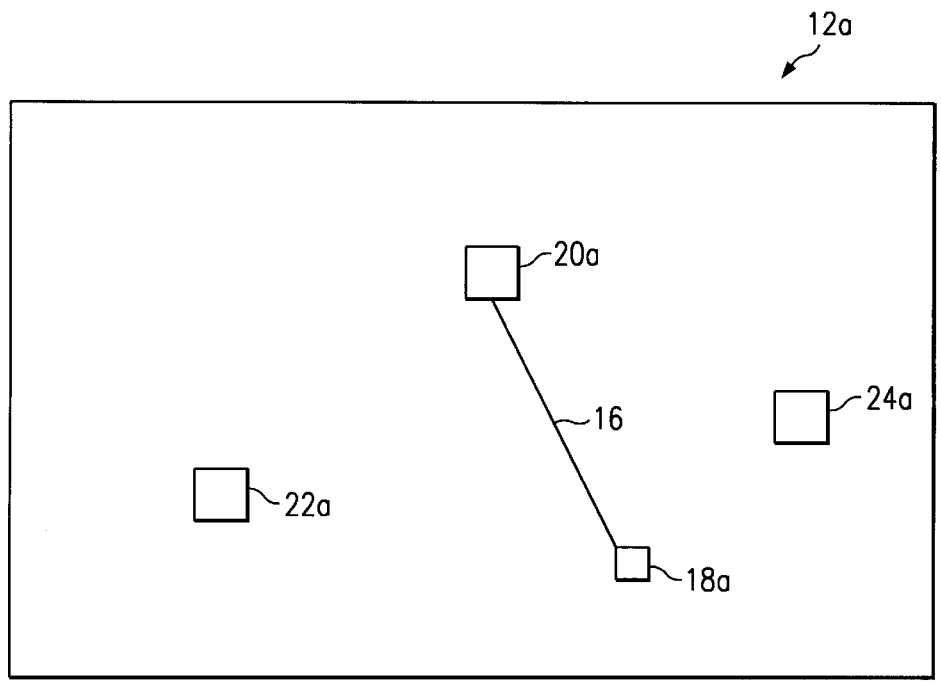
FIG. 2 is a submap of FIG. 1 in which the operator has selected a node symbol from the root map and placed the node symbol in the submap and determined that links with normal status will not be displayed.

Referring to FIG. 2, the submap symbol 12 represents a submap 12a. The operator creates the submap 12a in order to display the activity associated with the node symbol 20 without reproducing the entire network. To create the submap 12a, the operator selects the node symbol 20 to be replicated or moved from the root submap 10, to create a node symbol 20a in the submap 12a. The node symbol 20a retains characteristics and coordinates of the node symbol 20. In a similar manner, the operator selects node symbols 22 and 24 from the root submap 10 to create node symbols 22a and 24a in the submap 12a. Once the operator locates all the desired node symbols in the submap 12a, then the operator determines whether links in normal status are to be displayed in the submap 12a. For illustration purposes, the submap 12a corresponds to the situation when the operator determines that links with normal status should not be displayed. In order to display the link 16, a temporary symbol 18a is generated. Temporary symbols act only as endpoints for links. The link 16 is drawn between the node symbol 20a and the temporary symbol 18a. To indicate that the temporary symbol is in a temporary status, temporary symbols are graphically reduced in size, thereby visually distinguishing them from node symbols defined or selected by the operator, such as the node symbol 20a. Furthermore, temporary symbols are assigned a label and positioned in a manner corresponding to the node symbols of the root map 10 that they represent. For example, the temporary symbol 18a has some of the characteristics of the node symbol 18, FIG. 1. It is very expensive to store characteristics or attributes, and hence, the temporary symbols store a minimum set of characteristics of the node symbol, such as parent identification and label.

The link 16 is displayed as long as a condition causing the exception status exists. Once the condition no longer exists, the link 16 will be in the normal status. Consequently, the link 16 is removed from the submap 12a because the operator has determined that links having the normal status are not displayed. If the link 16 is removed, then the temporary symbol 18a is also removed, provided that no other displayed links, having the exception status, terminate at the temporary symbol 18a. Therefore, temporary symbols are dynamically generated in and removed from the submap 12a in response to changing conditions of the network.

When a link terminating at the temporary symbol is removed (e.g., the link changes from exception to normal status), then the corresponding temporary symbol is also removed from the submap 12a, provided no other links with an exception status terminate at that temporary node. However, if a link connects two node symbols, rather than a node symbol and a temporary symbol, then when the node symbols are not removed even though the link is removed and no other links terminated at one of the node symbols.

Figure 3:
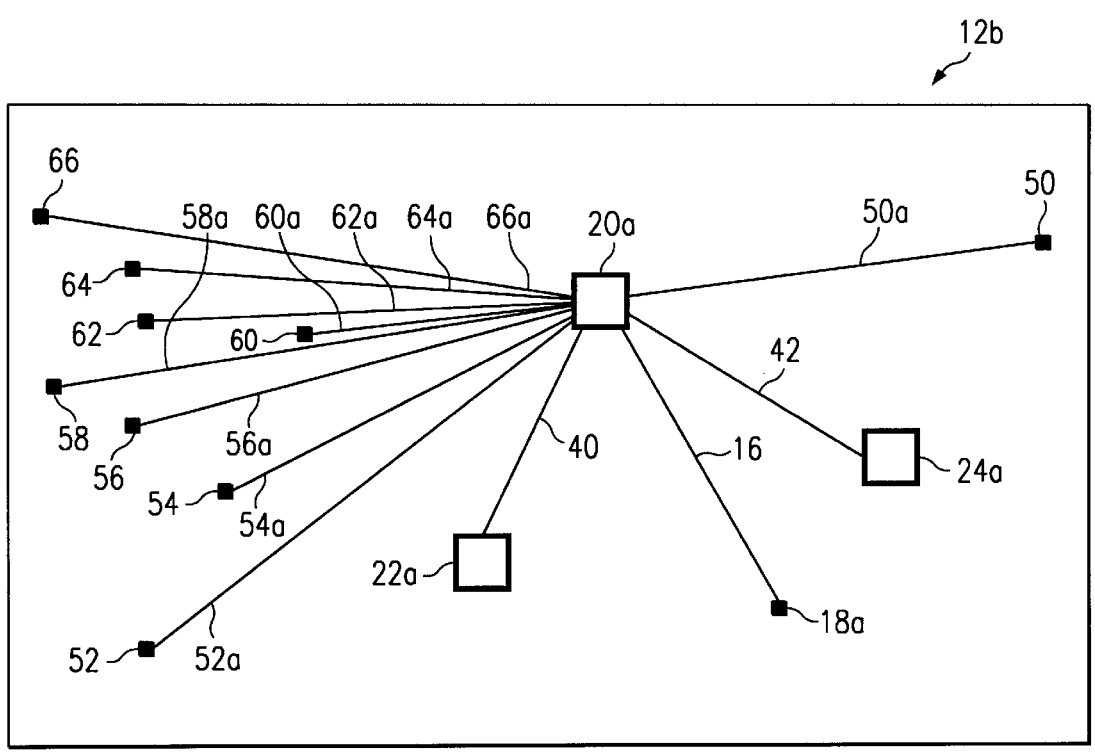
FIG. 3 is the submap of FIG. 2 wherein the operator has requested the system display links originating from the node symbol that are in normal status.

Referring now to FIG. 3, if the operator determines that links with the normal status should be displayed, then the submap symbol 12, FIG. 1, will represents a submap, generally designated 12b. The submap 12b has the node symbols 20a, 22a, and 24a that were created as discussed above. The node symbol 20a is connected to the node symbols 22a and 24a through links 40 and 42, respectively. The links 40 and 42 originate from the node symbol 20a and are in normal status. The submap 12b also has the temporary symbol 18a connect to the node symbol 20a using the link 16, which is in the exception status. The submap 12b has a plurality of temporary symbols 50, 52, 54, 56, 58, 60, 62, 64, and 66 connected to the node 20a through links 50a, 52a, 54a, 56a, 58a, 60a, 62a, 64a, and 66a, respectively. The links 50a, 52a, 54a, 56a, 58a, 60a, 62a, 64a, and 66a represent links originating from the node symbol 20a that are in the normal status. As the status of a link in the submap 12b changes, then the status of the link is updated to indicate the current status.

If new links are added to the network or as new link symbols are created, which originate from the node symbol 20a, additional temporary nodes are generated to act as endpoints for the new links and link symbols. As noted above, each temporary symbol is assigned some characteristic that includes at least one characteristic of the corresponding node symbol from the flat network 10, which they represent.

If the operator selects another node symbol from the root submap 10 for placement in the submap 12a or 12b, to create a newly defined node symbol, then the application first determines if any temporary symbol has the characteristics of the newly defined node symbol. If so, then that temporary symbol is replaced with the newly defined node symbol. Also, links, in both normal and exception status, terminating at the replaced temporary symbol are redrawn into the newly defined node symbol. If, however, a corresponding temporary symbol does not exists in the submap 12a or 12b, then the newly defined node symbol is added to the submap 12a or 12b. If any links originate from the newly defined node symbol that need to be displayed, then temporary symbols are created to act as endpoints in the manner set forth above.

Figure 4:
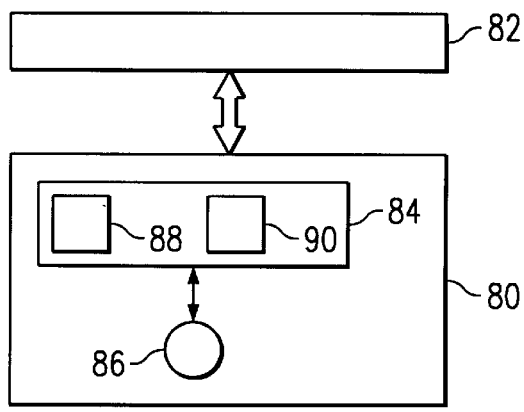
FIG. 4 is a block diagram of a system, which interfaces with a network processor, for implementing a flat network in a hierarchical network management system.

Referring now to FIG. 4, a system 80, in accordance with the present invention, interfaces with a network processor 82. The system 80 includes a processing unit 84 and a storage unit 86. The processing unit 84 includes a graphical user interface (GUI) 88 and an application unit 90. The application unit 90 displays only the links in exception status, unless the operator requests that the application unit 90 display the links in normal status. The network processor 82 monitors the status of the links in the network. As events occur that cause status changes in the network, the network processor 82 sends update information to a processing unit 84. The operator interfaces with the system 80 through the GUI 88. The GUI 88 displays the submaps depending on the selected display mode.

As temporary symbols are needed on any of the submaps, the application unit 90 retrieves the characteristic for the temporary node, which can include an address, a name, a symbol, or a label corresponding to a node symbol of the root map 10 from the storage unit 86. The application unit 90 can determine and assign the coordinates of the node symbol to the corresponding temporary symbol, thereby locating the temporary symbol on the selected submap. Once the temporary symbol has been located on the selected submap, then the application unit 90 generates the link originating from the node symbol in the selected submap and terminating at the temporary symbol.

Figure 5:
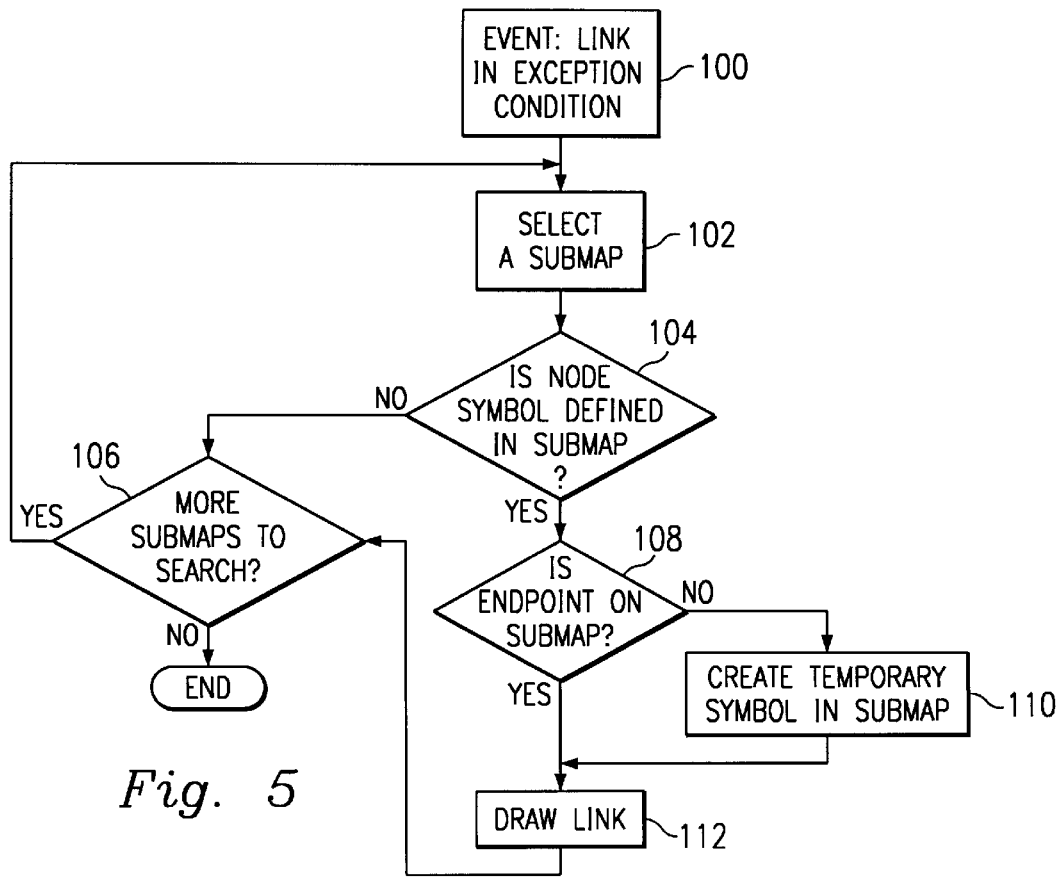
FIG. 5 is a flowchart for an event process corresponding to a link changing from normal to exception status.

Referring now to FIG. 5, as links change from normal status to exception status, the application unit 90 executes an event process 100. At step 102, one of the submaps is selected. At step 104, the selected submap is scanned to determine if the node symbol from which the link originates exists in the submap. If the node symbol does not exist in the submap then execution proceeds to step 106 to determined if there are additional submaps to search. At step 106, if there are no additional submap to search then execution for the event 100 ends. On the other hand, if there are more submaps to search then execution returns to step 102. Execution proceeds to step 108 from step 104, if the node symbol exists in the submap, to determine if an endpoint or temporary symbol for the link exists in the selected submap. At step 110, the temporary symbol is created if one does not exist in the submap. At step 112 the link is drawn, if the temporary symbol exits at step 108 or after one is created at step 110.

Referring now to FIG. 6, as the operator determines that links in normal status are not to be displayed for a selected node symbol that is currently displaying links in normal status, the application unit 90 executes an event process 120. The operator can make this selection if the operator previously selected to display the links in normal status for the same node symbol. At step 122, a link originating from the previously selected node symbol is selected from the submap. At step 124, if the link is in exception status, then execution moves to step 126. If the link is not in exception status then execution moves to step 128. At step 126, if there are more links to check in the submap, then execution return to step 122; otherwise execution ends. At step 128 if the link does not terminate at a temporary symbol, then execution proceeds to step 130. At step 130, the link is removed and execution moves to step 126. On the other hand, at step 128, if the link terminates at a temporary symbol then execution proceeds to step 132. At step 132, if the temporary symbol acts as an endpoint for other links, then execution moves to step 130. On the other hand, if at step 132 the temporary symbol is not used by other links then execution proceeds to step 134. At step 134 the temporary symbol is removed, thereby removing the link terminating at the temporary symbol and execution moves to step 126.

Referring to FIG. 7, when the operator determines that a submap should display links in normal status for a selected node symbol, then the application unit 90 executes an event process 140. At step 142, a link is selected originating from the selected node symbol on the submap. At step 144, if an endpoint for the link is not located in the submap, then execution proceeds to step 146. At step 146 a temporary symbol is created as the endpoint and execution proceeds to step 148. If at step 144 it is determined that the endpoint or temporary symbol does exist in the submap, then execution proceeds to step 148. At step 148, the link is drawn originating from an origination node symbol in the submap and terminating at the endpoint. At step 150, if more links need to be drawn, then execution returns to step 142. Otherwise if no more links need to be drawn then execution ends.

Figure 8:
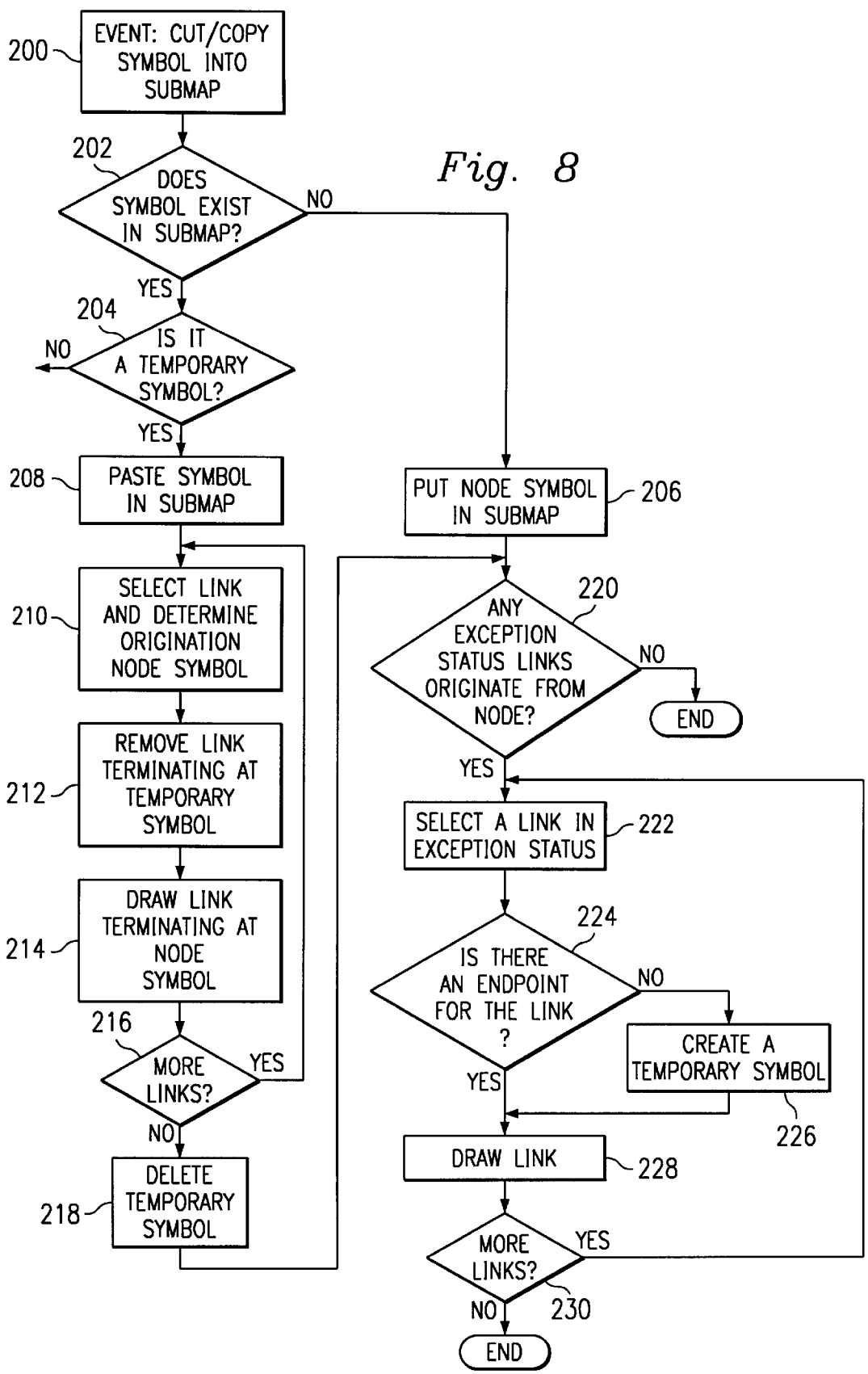
FIG. 8 is a flowchart for an event process corresponding to cutting or copying and pasting a node symbol from one submap to another submap.

Referring now to FIG. 8, when symbols are cut from one submap and pasted into a new submap, the application unit 90 executes an event process 200. At step 202, it is determined if the symbol exists in the submap. If the symbol exists in the submap, then execution moves to step 204. If the symbol does not exist in the submap, then execution moves to step 206. At step 206, the node symbol is pasted in the submap. At step 204, if the symbol is not a temporary symbol, then the event process 200 ends. If the symbol is a temporary symbol, then execution moves to step 208. At step 208, a node symbol is placed in the submap. At step 210, one of the links terminating at the temporary symbol is selected and an origination node symbol for the link is determined. At step 212, the link originating at the origination node symbol and terminating at the temporary symbol is removed. At step 214, the link is redrawn between the origination node symbol and the node symbol. At step 216, it is determined if more links terminate at the temporary symbol that need to be redrawn. If more links need to be redrawn execution returns to step 210, otherwise execution moves to step 218. At step 218, the temporary symbol is deleted. At step 220, it is determined if any links originating from the node symbol are in exception status. If there are no links in exception status that originate from the node symbol, then the event process 200 ends. If there are links in exception status origination from the node symbol, then execution moves to step 222. At step 222 one of the links in exception status is selected. At step 224, it is determined if there is a temporary symbol in the submap to act as an endpoint for the link in exception status originating from the node symbol. If the temporary symbol does not exist, then execution moves to step 226. If the temporary symbol does exist, then execution moves to step 228. At step 226, the temporary symbol is created. At step 228 the link in exception status is drawn. At step 230 if more links that are in exception status need to be drawn, execution returns to step 222. If no other links in exception status need to be drawn, then the event process 200 ends.

Figure 9:
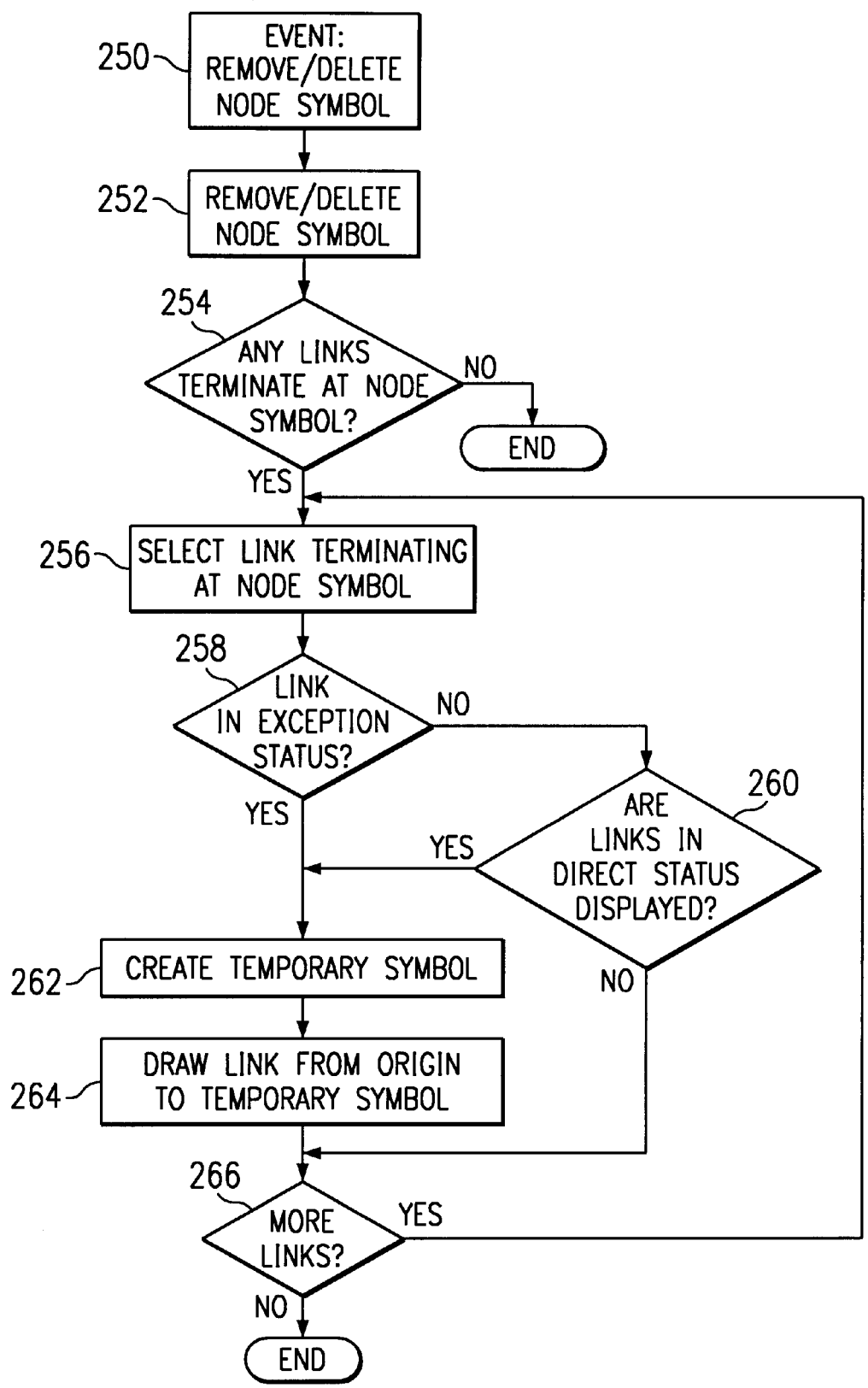
FIG. 9 is a flowchart for an event process corresponding to removing or deleting a node symbol from submaps.

Referring now to FIG. 9, as the operator removes or deletes a node symbol from a submap or if the node symbol is removed from the network, the application unit 90 executes an event process 250. At step 252, the node symbol is deleted or removed from one submap. At step 254, it is determined if any links terminate at the deleted node symbol. If no links terminate at the deleted node symbol in the submap, then the event process 250 ends. If links terminate at the deleted node symbol, then execution moves to step 256. At step 256, one of the links terminating at the deleted node symbol is selected. At step 258, it is determined if the selected link is in exception status. If the selected link is not in exception status, then execution moves to step 260. At step 260, it is determined if the operator has selected to display links in normal status. If links in normal status are displayed or if, at step 258, it is determined that the link is in exception status, then execution moves to step 262. At step 262, a temporary symbol having some of the characteristics of the deleted node symbol is created in the submap. At step 264, a link is drawn from an origination node symbol to the temporary symbol. At step 266, it is determined if more links terminate at the deleted node symbol. If more links terminate at the deleted node symbol, then execution returns to step 256. If no other links remain that terminated at the deleted node symbol, then the event process 250 ends.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A method for implementing a flat network in a hierarchical network management system comprising the steps of:

selecting a node of the flat network to create a submap having a node symbol, wherein the node symbol corresponds to the node; and generating a visible temporary symbol, in accordance with a predetermined criterion, for a link originating from the node symbol and terminating at the temporary symbol to represent a connection between the node and a second node of the flat network, wherein the temporary symbol maintains a characteristic of the second node.

2. The method of claim 1 wherein the step of selecting a node comprises the steps of:

selecting the node symbol from a plurality of node symbols;

reproducing the node symbol in the submap; and assigning a defined characteristic to the node symbol.

3. The method of claim 1 wherein the step of generating a temporary symbol comprises the steps of:

selecting the characteristic for the temporary symbol;

establishing the temporary symbol in the submap; and assigning the characteristic to the temporary symbol thereby identifying the temporary symbol.

4. The method of claim 1 further comprising the steps of:

generating a second temporary symbol and an exception link, wherein the exception link originates from the node symbol and terminates at the second temporary symbol;

removing the temporary symbol when the link is removed if no other links terminate at the temporary symbol; and removing the second temporary symbol when the exception link is removed if no other links terminate at the second temporary symbol.

5. The method of claim 1 wherein a second node symbol representing the second node replaces the temporary symbol in the submap when the second node symbol is placed in the submap.

6. The method of claim 1 further comprising the steps of:

scanning the submap to determine if a defined characteristic is present in the submap;

generating a second temporary symbol if the defined characteristic does not exist in the submap; and linking the second temporary symbol to the node symbol using a second link.

7. The method of claim 6 wherein the defined characteristic identifies the second temporary symbol.

8. The method of claim 1 wherein the characteristic comprises a coordinate for the temporary symbol corresponding to a coordinate of the second node.

9. The method of claim 8 wherein the coordinate is a row and column coordinate.

10. The method of claim 8 wherein the coordinate is a geographical coordinate.

11. The method of claim 1 wherein the link is in an exception status.

12. The method of claim 1 wherein the link is in a normal status.

13. The method of claim 1 wherein the predetermined criterion is that only links in exception status are displayed.

14. The method of claim 1 wherein links in normal status and temporary symbols having only links in normal status connected thereto are removed.

15. The method of claim 1 wherein the predetermined criterion is that links in exception status and links in normal status are displayed.

16. The method of claim 1 wherein the submap always displays links exception status.

17. The method of claim 1 wherein removal of the temporary symbol results in removal of all links that terminate at the temporary symbol.

18. A method for representing a flat network having a plurality of node symbols and a plurality of links in a submap using hierarchical management network arrangement, the method comprising the steps of:

selecting a display mode from two display modes;

relocating a node symbol into the submap;

generating a visible temporary symbol with a characteristic based on a predetermined criterion;

drawing a link originating at the node symbol and terminating at the temporary symbol; and updating the submap as conditions in the flat network change.

19. The method of claim 18 further comprising the steps of:

scanning the submap to determined if a second temporary symbol has a defined characteristic corresponding to a characteristic of a second node symbol;

generating a second node symbol having the defined characteristic;

placing the second node symbol in the submap;

connecting the node symbol to the second submap node symbol using a second link; and removing the second temporary symbol if the second temporary symbol signal has the defined characteristic.

20. The method of claim 19 further comprising the steps of:

removing the link when a status of the link differs from the display mode; and removing the temporary symbol when the link is removed if no other links of the submap terminate at the temporary symbol.

21. The method of claim 18 wherein the display mode is show only links in the submap in exception status.

22. The method of claim 18 wherein the display mode is show links in normal status and links in exception status.

23. The method of claim 18 wherein the predetermined criterion is that the characteristic of the temporary symbol does not exist in the submap.

24. A method for producing a submap from a flat network having a plurality of telecommunication switches comprising the steps of:

selecting a switch to be added to the submap;

determining if the switch includes a trunk to be displayed in the submap;

if the switch does include a trunk to be displayed, determining if an endpoint of the trunk is in the submap; and if the endpoint in not in the submap, generating a visible temporary symbol to act as the endpoint for the trunk and placing the temporary symbol in the submap, wherein the temporary symbol maintains a characteristic of the endpoint.

25. A method for implementing a flat network in a hierarchical network management system comprising the steps of:

selecting a node of the flat network to create a submap having a node symbol, wherein the node symbol corresponds to the node; and generating a temporary symbol, in accordance with a predetermined criterion, for a link originating from the node symbol and terminating at the temporary symbol to represent a connection between the node and a second node of the flat network, wherein the temporary symbol maintains a characteristic of the second node and the predetermined criterion is that only links in exception status are displayed.

26. The method of claim 25 wherein the step of selecting a node comprises the steps of:

selecting the node symbol from a plurality of node symbols;

reproducing the node symbol in the submap; and assigning a defined characteristic to the node symbol.

27. The method of claim 25 wherein the step of generating a temporary symbol comprises the steps of:

selecting the characteristic for the temporary symbol;

establishing the temporary symbol in the submap; and assigning the characteristic to the temporary symbol thereby identifying the temporary symbol.

28. The method of claim 25 further comprising the steps of:

generating a second temporary symbol and an exception link, wherein the exception link originates from the node symbol and terminates at the second temporary symbol;

removing the temporary symbol when the link is removed if no other links terminate at the temporary symbol; and removing the second temporary symbol when the exception link is removed if no other links terminate at the second temporary symbol.

29. The method of claim 25 wherein a second node symbol representing the second node replaces the temporary symbol in the submap when the second node symbol is placed in the submap.

30. The method of claim 25 further comprising the steps of:

scanning the submap to determine if a defined characteristic is present in the submap;

generating a second temporary symbol if the defined characteristic does not exist in the submap; and linking the second temporary symbol to the node symbol using a second link.

31. The method of claim 30 wherein the defined characteristic identifies the second temporary symbol.

32. The method of claim 25 wherein the characteristic comprises a coordinate for the temporary symbol corresponding to a coordinate of the second node.

33. The method of claim 32 wherein the coordinate is a row and column coordinate.

34. The method of claim 32 wherein the coordinate is a geographical coordinate.

35. The method of claim 25 wherein the link is in an exception status.

36. The method of claim 25 wherein the link is in a normal status.

37. The method of claim 25 wherein links in normal status and temporary symbols having only links in normal status connected thereto are removed.

38. The method of claim 25 wherein the predetermined criterion is that links in exception status and links in normal status are displayed.

39. The method of claim 25 wherein the submap always displays links exception status.

40. The method of claim 25 wherein removal of the temporary symbol results in removal of all links that terminate at the temporary symbol.

41. A method for representing a flat network having a plurality of node symbols and a plurality of links in a submap using hierarchical management network arrangement, the method comprising the steps of:

selecting a display mode that shows only links in the submap in exception status from two display modes;

relocating a node symbol into the submap;

generating a temporary symbol with a characteristic based on a predetermined criterion;

drawing a link originating at the node symbol and terminating at the temporary symbol; and updating the submap as conditions in the flat network change.

42. The method of claim 41 further comprising the steps of:

scanning the submap to determined if a second temporary symbol has a defined characteristic corresponding to a characteristic of a second node symbol;

generating a second node symbol having the defined characteristic;

placing the second node symbol in the submap;

connecting the node symbol to the second submap node symbol using a second link; and removing the second temporary symbol if the second temporary symbol signal has the defined characteristic.

43. The method of claim 42 further comprising the steps of:

removing the link when a status of the link differs from the display mode; and removing the temporary symbol when the link is removed if no other links of the submap terminate at the temporary symbol.

44. The method of claim 41 wherein the display mode is show links in normal status and links in exception status.

45. The method of claim 44 wherein the predetermined criterion is that the characteristic of the temporary symbol does not exist in the submap.

* * * * *